United States Patent
Zhang

(10) Patent No.: US 11,309,696 B2
(45) Date of Patent: Apr. 19, 2022

(54) CABLE CARRIER APPARATUS WITH POWER SUPPLY FUNCTION

(71) Applicant: INSPUR SUZHOU INTELLIGENT TECHNOLOGY CO., LTD, Jiangsu (CN)

(72) Inventor: Yanqun Zhang, Jiangsu (CN)

(73) Assignee: INSPUR SUZHOU INTELLIGENT TECHNOLOGY CO., LTD, Jiangsu (CN)

(*) Notice: Subject to any disclaimer, the term of this patent is extended or adjusted under 35 U.S.C. 154(b) by 0 days.

(21) Appl. No.: 17/281,262

(22) PCT Filed: Aug. 30, 2019

(86) PCT No.: PCT/CN2019/103723
§ 371 (c)(1),
(2) Date: Mar. 30, 2021

(87) PCT Pub. No.: WO2020/224129
PCT Pub. Date: Nov. 12, 2020

(65) Prior Publication Data
US 2022/0006278 A1    Jan. 6, 2022

(30) Foreign Application Priority Data
May 8, 2019   (CN) .......................... 201910379363.3

(51) Int. Cl.
*H02G 11/00*   (2006.01)
*H01R 11/01*   (2006.01)
*H02G 3/04*   (2006.01)

(52) U.S. Cl.
CPC ........... *H02G 11/006* (2013.01); *H01R 11/01* (2013.01); *H02G 3/0437* (2013.01)

(58) Field of Classification Search
CPC combination set(s) only.
See application file for complete search history.

(56) References Cited

U.S. PATENT DOCUMENTS 616,672 A  * 12/1898  Kelling ............... A61B 1/0055
                                                      600/142
680,328 A  *  8/1901  Henderson ............. F16L 27/11
                                                       285/226
(Continued)

FOREIGN PATENT DOCUMENTS

CN       1981144 A    6/2007
CN     206147374 U    5/2017
(Continued)

OTHER PUBLICATIONS

International Search Report for PCT/CN2019/103723 dated Feb. 14, 2020, ISA/CN.

*Primary Examiner* — William H. Mayo, III
*Assistant Examiner* — Krystal Robinson
(74) *Attorney, Agent, or Firm* — Yue (Robert) Xu; Apex Attorneys at Law, LLP

(57) ABSTRACT

Provided is a cable carrier apparatus with a power supply function. The apparatus includes a chain unit, where the chain unit includes a bottom plate, a side plate is provided on each of both sides of the bottom plate, a slot is provided on the side plate; a detachable plate is mounted in the slot, the chain unit is provided with a mounting hole and a mounting pillar, where a conductive layer is provided on each of both sides of the side plate of the chain unit, and an insulating layer is attached to an upper side of the conductive layer. In this way, the cable carrier can have a power supply function, and strong electricity and weak electricity are separated so as to reduce interferences.

4 Claims, 3 Drawing Sheets

(56) References Cited

U.S. PATENT DOCUMENTS

| | | | | |
|---|---|---|---|---|
| 1,347,470 A * | 7/1920 | Bard | F16L 27/073 | 285/271 |
| 1,475,090 A * | 11/1923 | Taylor | F16L 1/161 | 285/261 |
| 2,564,938 A * | 8/1951 | Warren | F16L 27/047 | 285/95 |
| 2,850,299 A * | 9/1958 | Risley | F16L 25/023 | 285/48 |
| 3,030,130 A * | 4/1962 | Appleton | F16L 33/224 | 285/248 |
| 3,139,115 A * | 6/1964 | Bawcon | F16L 51/024 | 138/121 |
| 3,197,954 A * | 8/1965 | Merker | F16L 3/015 | 59/78.1 |
| 3,330,105 A * | 7/1967 | Weber | B66C 13/12 | 59/78.1 |
| 3,650,550 A * | 3/1972 | West | B29C 63/346 | 285/55 |
| 3,770,022 A * | 11/1973 | Beisemann | F16L 3/015 | 138/108 |
| 3,848,407 A * | 11/1974 | Moritz | F16G 13/16 | 59/78.1 |
| 3,921,388 A * | 11/1975 | Loos | F16G 13/16 | 59/78.1 |
| 4,101,150 A * | 7/1978 | Thawley | E02F 7/10 | 285/226 |
| 4,104,871 A * | 8/1978 | Moritz | F16G 13/16 | 248/49 |
| 4,220,180 A * | 9/1980 | Koga | F16L 27/107 | 138/109 |
| 4,360,104 A * | 11/1982 | Lang | A61M 16/08 | 128/204.18 |
| 4,384,594 A * | 5/1983 | Moritz | H02G 11/006 | 138/120 |
| 4,625,936 A * | 12/1986 | Hadden, Sr. | B25J 9/06 | 138/120 |
| 4,727,908 A * | 3/1988 | Forster | H02G 11/006 | 138/120 |
| 5,463,187 A * | 10/1995 | Battle | F16L 7/00 | 138/111 |
| 5,992,896 A * | 11/1999 | Davey | F01N 13/1811 | 285/226 |
| 6,016,844 A * | 1/2000 | Takahashi | F16G 13/16 | 138/120 |
| 6,029,437 A * | 2/2000 | Hart | F16G 13/16 | 248/49 |
| 6,129,120 A * | 10/2000 | Margot | H02G 3/0468 | 138/121 |
| 6,161,373 A * | 12/2000 | Heidrich | F16G 13/16 | 248/49 |
| 6,311,736 B2 * | 11/2001 | Herman | B21C 37/124 | 138/131 |
| 6,695,014 B2 * | 2/2004 | Blase | H02G 11/006 | 138/120 |
| 6,708,480 B1 * | 3/2004 | Wehler | F16G 13/16 | 248/49 |
| 6,715,799 B2 * | 4/2004 | Hardy | F16L 11/15 | 285/223 |
| 6,859,956 B2 * | 3/2005 | Mantyla | E03C 1/284 | 137/247.23 |
| 7,418,812 B2 * | 9/2008 | Ikeda | F16G 13/16 | 59/78.1 |
| 7,469,722 B2 * | 12/2008 | Berland | H01R 13/562 | 138/110 |
| 8,388,520 B2 * | 3/2013 | Stefanchik | A61B 1/00078 | 600/144 |
| 8,622,481 B2 * | 1/2014 | Niederriter | G02B 6/4461 | 299/43 |
| 9,198,561 B2 * | 12/2015 | Smith | A61M 25/0147 | |
| 9,364,230 B2 * | 6/2016 | Shelton, IV | A61B 17/07207 | |
| 9,809,179 B2 * | 11/2017 | Inoue | H02G 3/0406 | |
| 9,810,349 B2 * | 11/2017 | Lee | F16L 11/18 | |
| 10,028,744 B2 * | 7/2018 | Shelton, IV | A61B 17/0644 | |
| 10,377,327 B1 * | 8/2019 | Katoh | H02G 11/00 | |
| 2001/0025715 A1 | 10/2001 | Muller | F16L 3/26 | 174/19 |
| 2001/0048989 A1 * | 12/2001 | Fukui | F16L 11/16 | 428/36.1 |
| 2001/0054820 A1 * | 12/2001 | Starita | F16L 25/0054 | 285/364 |
| 2002/0043591 A1 * | 4/2002 | Sakai | H02G 11/006 | 248/49 |
| 2002/0161281 A1 * | 10/2002 | Jaffe | A61B 5/065 | 600/114 |
| 2002/0167167 A1 * | 11/2002 | Elder | B29C 45/0017 | 285/261 |
| 2003/0042040 A1 * | 3/2003 | Komiya | H02G 11/006 | 174/72 A |
| 2003/0184086 A1 * | 10/2003 | Christianson | F16L 11/18 | 285/146.1 |
| 2004/0108127 A1 * | 6/2004 | Aoki | B60R 16/0215 | 174/72 A |
| 2005/0006894 A1 * | 1/2005 | Karasawa | F16L 37/138 | 285/146.1 |
| 2005/0023037 A1 * | 2/2005 | Camp | E21B 7/067 | 175/61 |
| 2005/0038318 A1 * | 2/2005 | Goldwasser | A61B 1/018 | 600/104 |
| 2005/0082824 A1 * | 4/2005 | Luettgen | H01R 35/00 | 285/146.1 |
| 2005/0242574 A1 * | 11/2005 | Cowie | F16L 25/10 | 285/146.1 |
| 2005/0250990 A1 * | 11/2005 | Le | A61B 1/31 | 600/114 |
| 2005/0274850 A1 | 12/2005 | Blase et al. | | |
| 2007/0068694 A1 * | 3/2007 | Utaki | H02G 11/006 | 174/19 |
| 2010/0069715 A1 * | 3/2010 | Perry | A61B 1/00154 | 600/114 |
| 2012/0261184 A1 * | 10/2012 | Kitamura | H02G 3/0468 | 174/72 A |
| 2012/0267164 A1 * | 10/2012 | Reuss | H02G 3/0487 | 174/70 R |
| 2014/0020358 A1 * | 1/2014 | Blase | H02G 3/0475 | 59/78.1 |
| 2014/0345739 A1 * | 11/2014 | Graham | F16L 11/18 | 138/120 |
| 2016/0109046 A1 * | 4/2016 | Lee | F16L 9/22 | 285/261 |
| 2018/0097348 A1 * | 4/2018 | Zurovec | G01V 1/3808 | |
| 2018/0209576 A1 * | 7/2018 | Whitefield | H02G 9/12 | |
| 2021/0364548 A1 * | 11/2021 | Iadanza | H02G 9/025 | |

FOREIGN PATENT DOCUMENTS

| | | | |
|---|---|---|---|
| CN | 110137868 A | 8/2019 | |
| DE | 202004005848 U1 * | 2/2005 | F16G 13/16 |
| FR | 2875065 A1 | 3/2006 | |

* cited by examiner

CABLE CARRIER APPARATUS WITH POWER SUPPLY FUNCTION

This application is the national phase of International Application No. PCT/CN2019/103723, titled "CABLE CARRIER APPARATUS WITH POWER SUPPLY FUNCTION", filed on Aug. 30, 2019, which claims the priority to Chinese Patent Application No. 201910379363.3, titled "CABLE CARRIER APPARATUS WITH POWER SUPPLY FUNCTION", filed on May 8, 2019 with the China National Intellectual Property Administration (CNIPA), which is incorporated herein by reference in its entirety.

FIELD

The present disclosure relates to the field of servers, and in particular to a cable carrier apparatus with a power supply function.

BACKGROUND

At present, in a server system, there is an increasing need for high-power supply and maintainability. Regarding power supply manner, many devices are currently power supplied by a copper bar with great current. Moreover, for sake of convenience of device maintenance, regarding to a cable management manner, a cable carrier is used to manage cables between card boards and between a card board and a device. Generally, strong electricity and weak electricity are mixed in the cable carrier, resulting in unstable signal output and interference. Further, the strong electricity occupies a certain amount of the cable carriers' space, reducing a total number of signal cables in the cable carrier, or leading to a usage of a cable carrier with a large volume, which is not aesthetic and has a high cost.

SUMMARY

In the light of the problem of unstable signal output due to mixed strong electricity and weak electricity currently existed in a cable management process of a cable carrier, a cable carrier apparatus with a power supply function is provided by the present disclosure, so as to avoid the above problem.

The technical solutions provided by the present disclosure to solve the problem are as follows.

A cable carrier apparatus with a power supply function includes a chain unit. The chain unit includes a bottom plate, a side plate is provided on each of both sides of the bottom plate, a slot is provided on the side plate; a detachable plate is mounted in the slot, and the chain unit is provided with a mounting hole and a mounting pillar. A conductive layer is provided on each of both sides of the side plate of the chain unit, and an insulating layer is attached to an upper side of the conductive layer. The design of setting a conductive layer at each of both terminals of the chain unit realizes the technical effect of utilizing a cable carrier to supply power. Through an assembly process, an impact of strong electricity on weak electricity is avoided while reducing costs, and a reliability of a product is improved. At this point, a similar technical effect may also be achieved by wrapping an insulating layer around a conductive layer and attaching the conductive layer to the side plate. The above equivalent replacement also falls within the scope of protection of the present disclosure.

In an embodiment, the conductive layer includes a straight conductive pillar, an arc-shaped connecting pillar, an intermediate conductive pillar and an arc-shaped conductive plate. A mounting groove is provided in the insulating layer. The straight conductive pillar, the arc-shaped connecting pillar, the intermediate conductive pillar and the arc-shaped conductive plate are sequentially mounted in the mounting groove. By the design of the mounting slot the conductive module is completely hidden in the chain unit, which improves the safety and reliability factor.

In an embodiment, a shape of the arc-shaped conductive plate matches an edge of the side plate.

In an embodiment, the mounting groove includes a first channel, an adjustment cavity, an arc-shaped channel, an end channel and an outer arc-shaped opening. The first channel, the adjustment cavity, the arc-shaped channel, the end channel and the outer arc-shaped opening are connected in sequence. A first spring and a second spring are mounted in the adjustment cavity, the first spring is connected with a first wheel, and the second spring is connected with a second wheel. The straight conductive pillar enters the mounting groove through the first channel, and exits from the end channel after bypassing the first wheel and the second wheel. The telescopic design of the length of the straight conductive pillar avoids interference during rotation of the chain unit.

In an embodiment, the conductive layer is made of a conductive material.

In an embodiment, a conductive path formed by the conductive layer at one side of the chain unit is used to supply power, a conductive path formed by the conductive layer at the other side of the chain unit is used to feedback current through ground, and a power supply connector arranged at both terminals of a cable carrier is connected to a power supply terminal and a card board at a powered-consumed terminal.

The present disclosure has beneficial effects that strong electricity and weak electricity are separated by combining inherent features of the cable carrier with practices, thereby solving the problem existed in the conventional technology, and moreover, costs are reduced and the amount of power supply cables is decreased, which makes the cable carrier aesthetic and minimizes the size of finished products.

In the figures, 1 represents chain unit, 11 represents bottom plate, 12 represents side plate, 121 represents mounting hole, 122 represents mounting pillar, 123 represents slot, 2 represents fixed unit, 3 represents movable unit, 4 represents detachable plate, 5 represents conductive layer, 6 represents insulating layer, 61 represents mounting groove, 71 represents straight conductive pillar, 72 represents arc-shaped connecting pillar, 73 represents intermediate conductive pillar, and 74 represents arc-shaped conductive plate.

DETAILED DESCRIPTION

Figure 1:
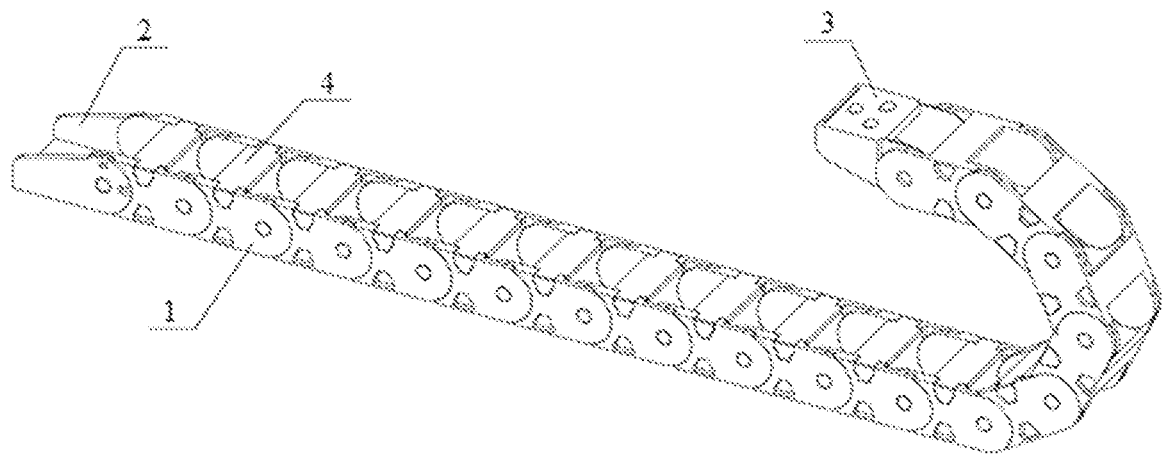
FIG. 1 is a schematic diagram of a three-dimensional structure of a cable carrier in the conventional technology.
Figure 2:
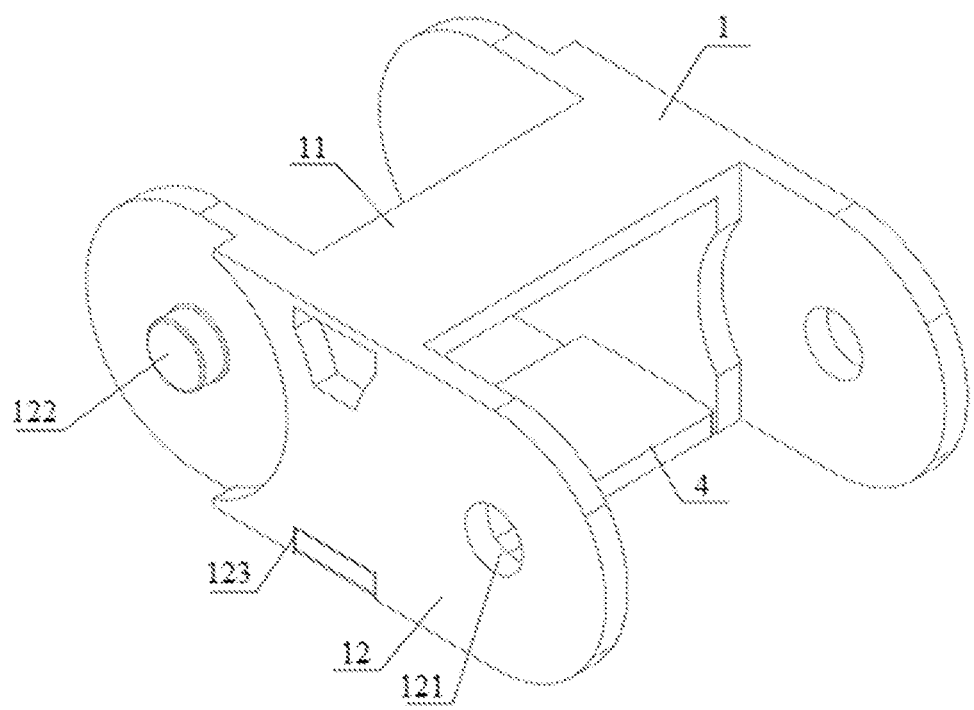
FIG. 2 is a schematic diagram of a three-dimensional structure of a chain unit.
Figure 3:
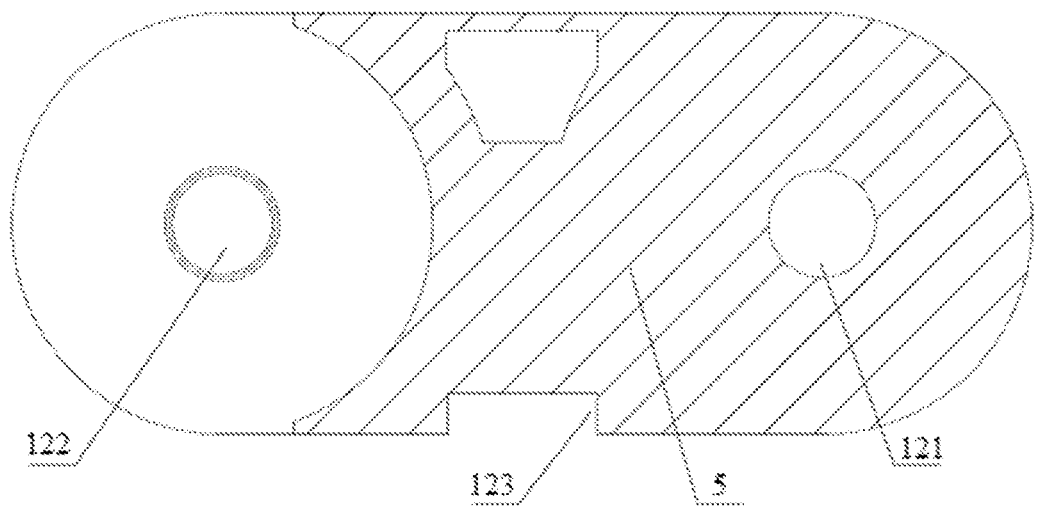
FIG. 3 is a sectional view of a first embodiment of the present disclosure.

As shown in FIG. 1 and FIG. 2, the cable carrier in the conventional technology generally includes a fixed unit 2 and a movable unit 3. The fixed unit 2 and the movable unit 3 are connected end to end through a series of chain units 1 connected there between.

The chain unit includes a bottom plate 11, a side plate 12 is provided on each of both sides of the bottom plate, a slot 123 is provided on the side plate, and a detachable plate 4 is mounted in the slot. Data lines and signal lines are arranged in a cavity enclosed by the bottom plate, side plates and the detachable plate.

A mounting hole 121 and a mounting pillar 122 are provided on the chain unit. The mounting pillar of the chain unit is used to be mounted in a mounting hole of an adjacent chain unit. Similarly, the mounting hole of the chain unit is mounted with a mounting post of another adjacent chain unit.

The cable carrier apparatus with a power supply function includes a chain unit 1. A conductive layer 5 is provided on each of two side plates of the chain unit, and an insulating layer 6 is attached to an upper side of the conductive layer 5. The conductive layer 5 is made of a conductive material. A conductive path formed by the conductive layer at one side of the chain unit is used to supply power, and a conductive path formed by the conductive layer at the other side of the chain unit is used to feedback current through ground. A power supply connector or other connection device is added at both terminals of the cable carrier, and is connected to a power supply terminal and a card board or a device at a powered-consumed terminal.

In this way, on one hand, the cable carrier provides a function of managing cables within the carrier; on the other hand, a conductive path arranged at both terminals of the cable carrier is connected to a power supply terminal and a card board terminal required for power supply, which can also realize the power supply function on the basis of cable management by the cable carrier.

Figure 4:
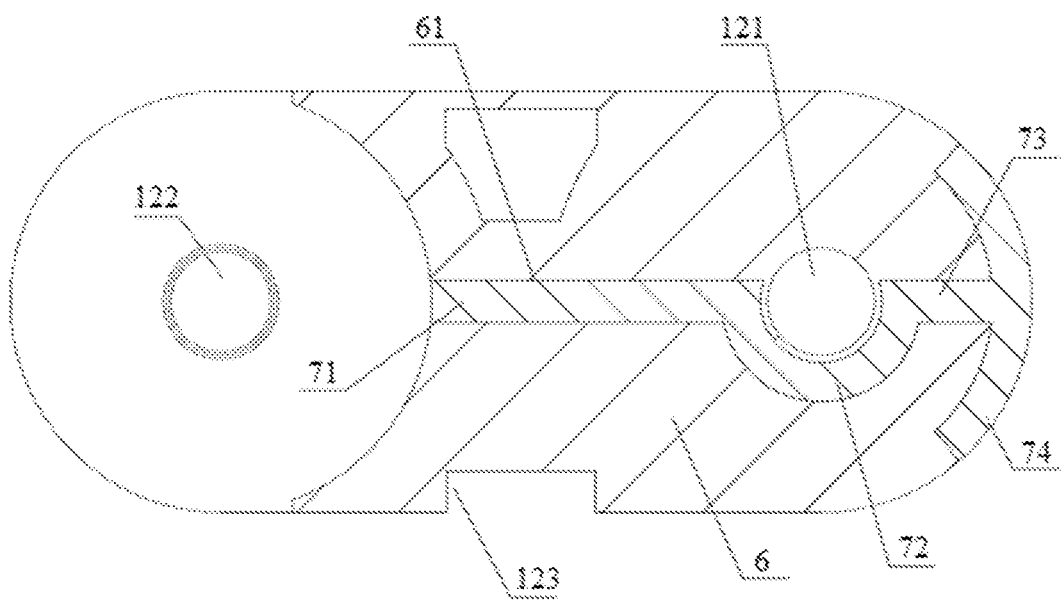
FIG. 4 is a sectional view of a second embodiment of the present disclosure.
Figure 5:
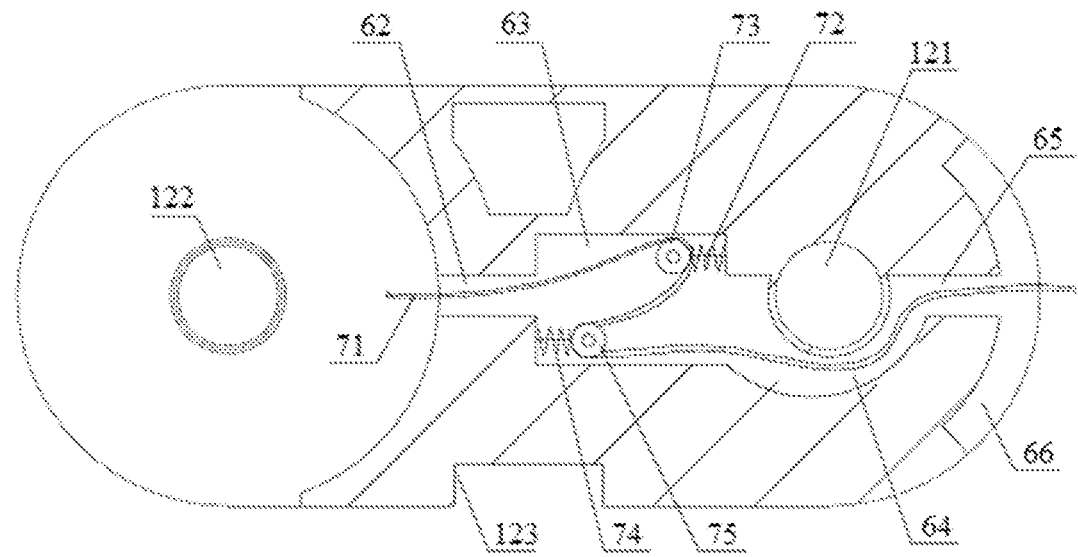
FIG. 5 is a sectional view of a third embodiment of the present disclosure.

An optimized design of the solution is shown in FIG. 4. An insulating layer 6 is provided on each of two side plates of the chain unit. A mounting groove 61 is provided in the insulating layer. A straight conductive pillar 71, an arc-shaped connecting pillar 72, an intermediate conductive pillar 73 and an arc-shaped conductive plate 74 are sequentially mounted in the mounting groove. The straight conductive pillar is connected to the arc-shaped connecting pillar, the arc-shaped connecting pillar is connected to the intermediate conductive pillar, and the intermediate conductive pillar is connected to the middle of the arc-shaped conductive plate. The straight conductive pillar is in contact with an arc-shaped conductive plate of another chain unit, to ensure the continuity of electricity.

The shape of the arc-shaped conductive plate matches an edge of the side plate.

Figure 6:
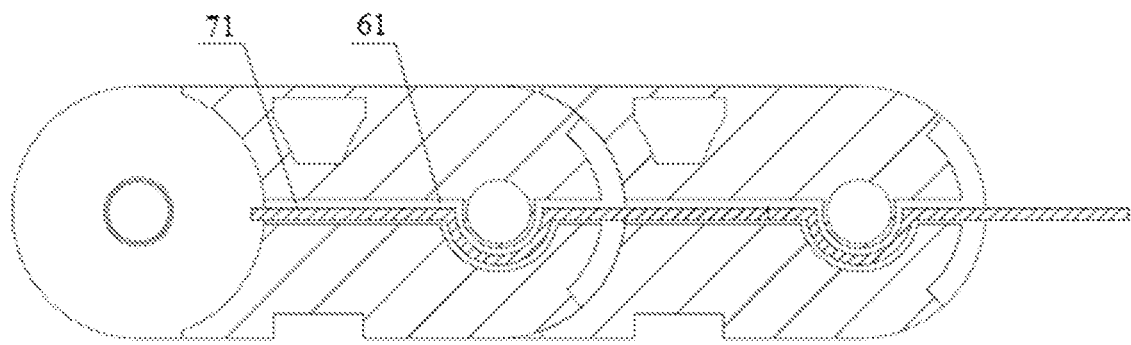
FIG. 6 is a sectional view of a fourth embodiment of the present disclosure.

A complete straight conductive pillar 71 may also be disposed in the mounting groove. As shown in FIG. 6, the diameter of the mounting groove needs to be greater than the diameter of the straight conductive pillar, and there is a certain gap between the mounting groove and the straight conductive pillar, so as to prevent the chain unit from being unable to rotate due to an over stretching of the straight conductive pillar when the chain unit is rotating at a certain angle.

With the design further optimized, the mounting groove includes a first channel 62, an adjustment cavity 63, an arc-shaped channel 64, an end channel 65 and an outer arc-shaped opening 66. The first channel 62, the adjustment cavity 63, the arc-shaped channel 64, the end channel 65 and the outer arc-shaped opening 66 are connected in sequence.

A first spring 72 and a second spring 74 are mounted in the adjustment cavity. The first spring is connected with a first wheel 73, and the second spring is connected with a second wheel 75. The straight conductive pillar enters the mounting groove through the first channel, and exits from the end channel after bypassing the first wheel and the second wheel. The straight conductive pillar may enter a mounting groove of another chain unit.

With the above design, strong electricity and weak electricity are separated by a chain unit, so as to avoid interference of the strong electricity, and the chain unit may also achieve the power supply function.

All other features except for the technical features described in the specification are known techniques for those skilled in the art.

The invention claimed is:

1. A cable carrier apparatus with a power supply function, comprising a chain unit, wherein the chain unit comprises a bottom plate, a side plate is provided on each of both sides of the bottom plate, a slot is provided on the side plate; a detachable plate is mounted in the slot, the chain unit is provided with a mounting hole and a mounting pillar, wherein a conductive layer is provided on each of both sides of the side plate of the chain unit, and an insulating layer is attached to an upper side of the conductive layer wherein the conductive layer comprises a straight conductive pillar, an arc-shaped connecting pillar, an intermediate conductive pillar and an arc-shaped conductive plate, wherein a mounting groove is provided in the insulating layer, the straight conductive pillar, the arc-shaped connecting pillar, the intermediate conductive pillar and the arc-shaped conductive plate are sequentially mounted in the mounting groove; wherein the mounting groove comprises a first channel, an adjustment cavity, an arc-shaped channel, an end channel and an outer arc-shaped opening, wherein the first channel, the adjustment cavity, the arc-shaped channel, the end channel and the outer arc-shaped opening are connected in sequence, wherein a first spring and a second spring are mounted in the adjustment cavity, the first spring is connected with a first wheel, the second spring is connected with a second wheel, the straight conductive pillar enters the mounting groove through the first channel, and exits from the end channel after bypassing the first wheel and the second wheel.

2. The cable carrier apparatus with a power supply function according to claim 1, wherein a shape of the arc-shaped conductive plate matches an edge of the side plate.

3. The cable carrier apparatus with a power supply function according to claim 1, wherein the conductive layer is made of a conductive material.

4. The cable carrier apparatus with a power supply function according to claim 1, wherein a conductive path formed by the conductive layer at one side of the chain unit is used to supply power, a conductive path formed by the conductive layer at the other side of the chain unit is used to feedback current through ground, and a power supply connector arranged at both terminals of a cable carrier is connected to a power supply terminal and a card board at a powered-consumed terminal.

* * * * *